(12) United States Patent
Legrand

(10) Patent No.: US 6,601,373 B1
(45) Date of Patent: Aug. 5, 2003

(54) CUTTING HEAD FOR BRUSH CUTTERS OR EDGE TRIMMERS

(75) Inventor: Emmanuel Legrand, Villeneuve (FR)

(73) Assignee: Speed France (FR)

( * ) Notice: Subject to any disclaimer, the term of this patent is extended or adjusted under 35 U.S.C. 154(b) by 0 days.

(21) Appl. No.: 09/586,438

(22) Filed: Jun. 2, 2000

(30) Foreign Application Priority Data

Jun. 4, 1999 (FR) .............................................. 99 11704

(51) Int. Cl.$^7$ .............................................. A01D 34/00
(52) U.S. Cl. .......................................... 56/12.7; 30/276
(58) Field of Search ............................ 30/276; 56/12.1, 56/12.7, 17.5, 255, 294, 295

(56) References Cited

U.S. PATENT DOCUMENTS

| | | | | |
|---|---|---|---|---|
| 4,268,964 A | * | 5/1981 | Moore | ........................ 30/276 |
| 4,513,563 A | | 4/1985 | Roser et al. | |
| 4,819,416 A | * | 4/1989 | Jones | ........................ 56/12.7 |
| 4,936,884 A | * | 6/1990 | Campbell | ................... 56/12.7 |
| 5,197,264 A | * | 3/1993 | Lacey | ........................ 56/12.1 |

FOREIGN PATENT DOCUMENTS

| | | |
|---|---|---|
| DE | 24 44 610 A | 4/1975 |
| GB | 1 583 521 A | 1/1981 |
| GB | 2 214 048 A | 8/1989 |
| NL | 8 302 111 A | 1/1985 |

* cited by examiner

*Primary Examiner*—Robert E. Pezzuto
(74) *Attorney, Agent, or Firm*—Cantor Colburn LLP

(57) ABSTRACT

This rotary cutting head uses relatively short, individually retained, cutting line filaments. It includes, between its periphery and a central recess, at least one radial passageway of cross section corresponding to twice the cross section of a filament. Each filament passes through the corresponding passageway a first time and is folded through 180° in the recess, in order to pass through the passageway a second time, the 180° folding of the filament forming a lateral swelling which ensures its retention. The two free line portions, resulting from the folding, are of the same length and extend parallel to one another, in the same plane perpendicular to the axis of the head, thereby reducing the sound level of the cutting head during operation.

6 Claims, 2 Drawing Sheets

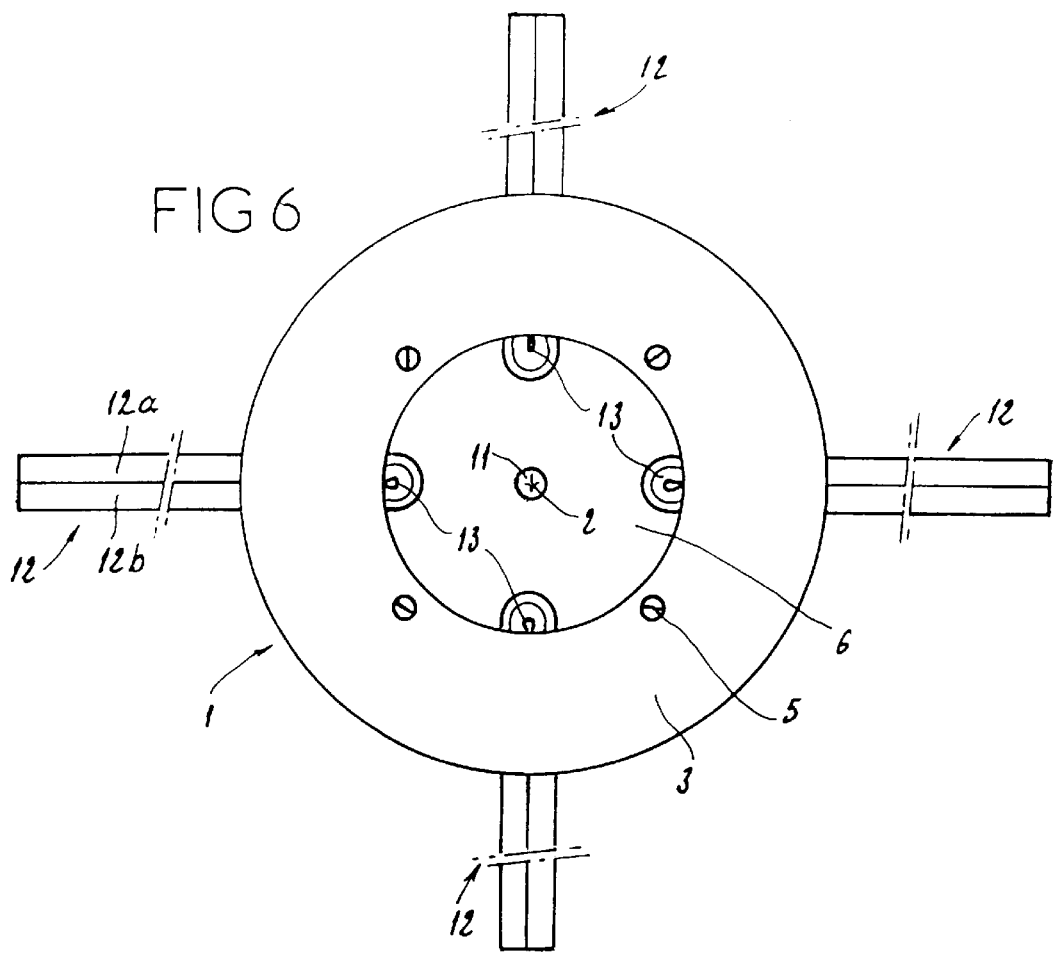
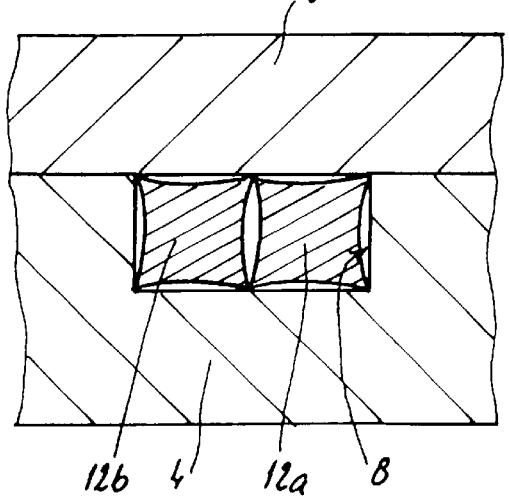
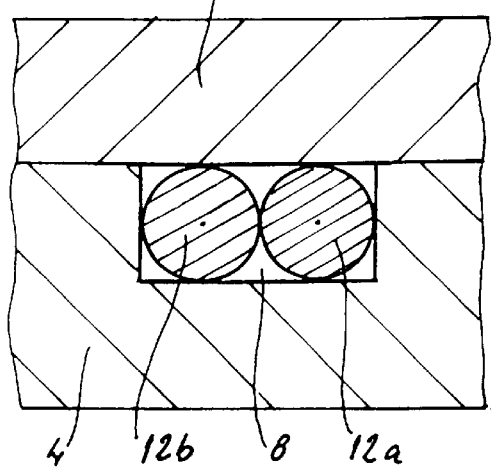

CUTTING HEAD FOR BRUSH CUTTERS OR EDGE TRIMMERS

TECHNICAL FIELD

The present invention relates to mechanized farming machines commonly called brush cutters and edge trimmers, intended for cutting vegetation by means of cutting lines. This invention relates more particularly to the rotary cutting heads for such machines.

These machines are generally equipped with an internal combustion engine or electric motor which rotates, at a high speed possibly of between approximately 3000 revolutions per minute and 12,000 revolutions per minute, a rotary head supporting one or more cutting lines. During rotation of the head, and owing to the effect of the centrifugal force, the cutting line or lines are deployed radially and thus sweep a certain circular region within which they exert a cutting effect on the vegetation encountered.

BACKGROUND OF THE INVENTION

At the present time, two broad categories of cutting heads are known for this kind of machine. The first type of head contains a reel of cutting line, which can be gradually paid out as the line used becomes worn or breaks. The second known type of head, to which the present invention also applies, does not use a reel of line but only one or more relatively short cutting line filaments which have to be fixed individually to the head. With regard to the latter type of cutting head, reference may be made to documents U.S. Pat. No. 4,513,563, NL-A-8,302,111, GB-A-2,214,048 and GB-A-1,583,521. In some of these documents, the cutting line filaments are folded in their middle, which also constitutes their fastening region, so that each forms two parallel cutting line portions approximately of the same length.

Reference may also be made here to document DE-A-2,444,610 (FIG. 2), which relates to a mower and not to a brush cutter or an edge trimmer, and in which the two parallel portions of the wire filament, which forms a loop, are linked together so that these portions do not form two separate flexible cutting elements but form a single, rigid, cutting member. This embodiment remains, structurally and operationally, remote from the subject-matter of the present invention, as defined below.

All the current cutting heads, with or without a reel of cutting line, are difficult to reload, and/or are of complicated and expensive structure, and also pose various problems.

Among others, conventional cutting lines, in the form of smooth monofilaments, are noisy in operation and thus generate noise pollution. In order to try to reduce the operating noise, the current lines of research consist in providing cutting lines with a special, generally non-smooth, shape: corrugated lines, ribbed or grooved lines, lines with a granular coating, etc.

Considering more particularly the constructions in the aforementioned documents U.S. Pat. No. 4,513,563, NL-A-8,302,111, GB-A-2,214,048 and GB-A-1,583,521, it is found that the two parallel portions of each folded line filament always lie in two separate planes, perpendicular to the axis of the head, that is to say they have a certain axial offset one with respect to the other and are not contained in the same plane perpendicular to the axis of the head. Such a configuration does not allow the operating noise of the cutting head to be reduced.

Now, it has been found, surprisingly, that the arrangement of two free line portions placed "in parallel", and in the same plane, resulted in an appreciable reduction in the noise level during operation, even when using a smooth line of ordinary cross section (round or square).

SUMMARY OF THE INVENTION

Starting from this observation, the subject of the invention is a cutting head for brush cutters or edge trimmers, of the kind using relatively short cutting line filaments, individually retained on the head, wherein the cutting line filament or filaments form one or more pairs of parallel cutting line portions approximately of the same length, which are free and extend in the same plane perpendicular to the axis of the head, so as to reduce the sound level during operation.

Thus, the proximity (which varies depending on the diameter) of the cutting line portions, combined in pairs, creates an interaction between the turbulence from each line portion, which reduces the tendency of these line portions to vibrate: the turbulence from the line portion lying upstream (with respect to the direction of rotation of the head) "blocks" the turbulence from the line portion lying downstream, and consequently reduces the overall turbulence and the noise generated. Tests carried out by the Applicant have confirmed the reality of this phenomenon, and its permanence over time, during rotation of the head.

BRIEF DESCRIPTION OF THE DRAWINGS

The invention will be more clearly understood with the aid of the description which follows, with reference to the appended schematic drawing showing, by way of example, one embodiment of this cutting head for brush cutters or edge trimmers.

FIG. 4 is another partial sectional view of the same head, on IV—IV in FIG. 2, on an enlarged scale;

FIG. 5 is a sectional view similar to FIG. 4, illustrating an alternative embodiment relating to the cross section of the cutting line filaments;

FIG. 6 is a plan view from below of the same cutting head, used with filaments differing in number.

DETAILED DESCRIPTION OF THE PREFERRED EMBODIMENT

Figure 1:
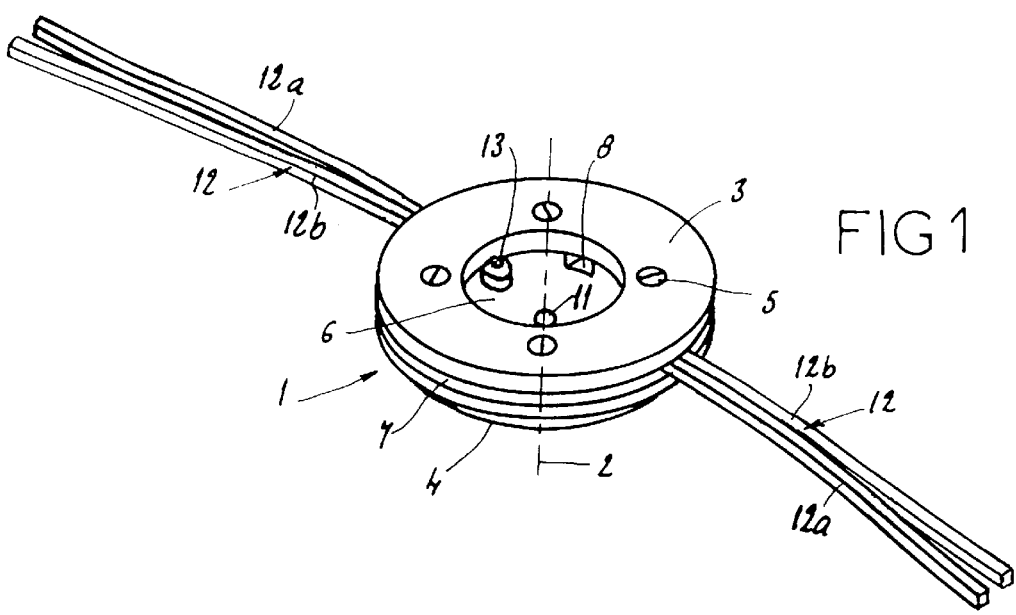
FIG. 1 is a perspective of a cutting head according to the present invention.

A rotary cutting head shown in FIG. 1, denoted overall by the reference 1, has a central axis 2 and results from the juxtaposition of circular pieces 3 and 4 joined together by means of several screws 5. The first piece 3 is of annular shape and the second piece 4 is of domed circular shape, so as to create, in the head 1, a central recess in the form of an approximately hemispherical cavity. The shape of the pieces 3 and 4 joined together defines a peripheral annular groove 7.

Provided between the central recess 6 and the peripheral groove 7 in the head 1 are, in the example illustrated in the drawing, four radial passageways 8 spaced apart by regular angular intervals of 90°. As shown in FIGS. 4 and 5, each radial passageway 8 has a rectangular cross section, with a length equal to twice its height.

Figure 2:
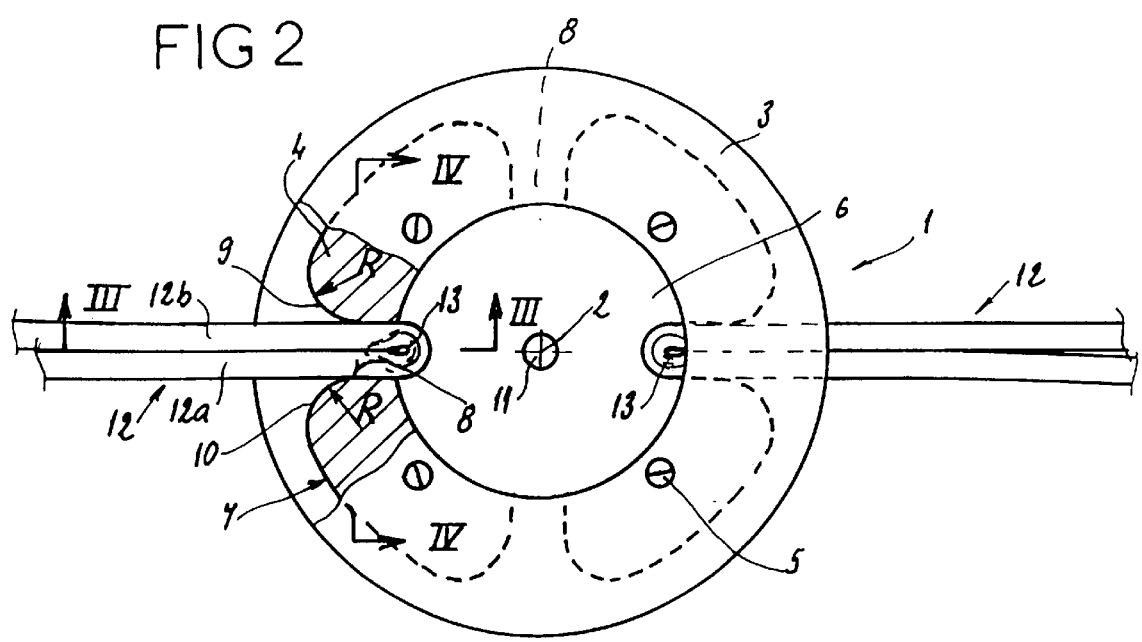
FIG. 2 is a plan view from below, in partial section, of the cutting head of FIG. 1.

As shown in FIG. 2, each radial passageway 8 has, at its outlet into the peripheral groove 7 in the head 1, a flaring resulting from two rounded adjoining surfaces 9 and 10, arranged symmetrically. The radius of curvature R and the developed length of each rounded surface 9 or 10 are relatively large, for example about 1 to 2 cm. The cutting head 1 also has a tapped hole 11 located on its central axis 2, at the bottom of the central recess 6, in order for it to be fastened to a machine such as a brush cutter or edge trimmer and for it to be driven in rotation by the drive means of this machine.

Each radial passageway 8 in the head 1 may house a cutting line filament 12, especially made of synthetic material, FIG. 1 showing the head 1 provided only with two diametrally opposed filaments 12 and FIG. 6 illustrating the possibility of providing this head 1 with four filaments 12 separated by angular intervals of 90°.

Figure 3:
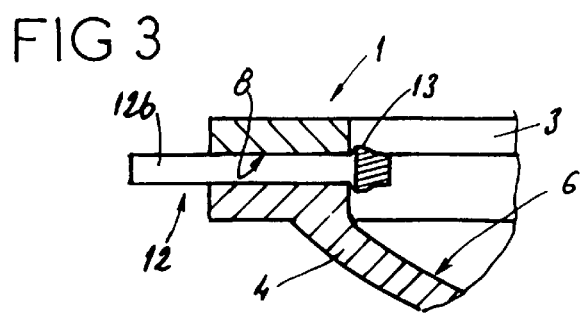
FIG. 3 is a partial sectional view of this head on III—III in FIG. 2.

Each cutting line filament 12 is fastened to the head 1 by passing through a passageway 8 a first time, from the outside toward the inside, and then being folded through 180° inside the central recess 6 and finally by passing through the same radial passageway 8 a second time, from the inside toward the outside. At the point of 180° folding of the filament 12, this folding forms a lateral swelling 13 of the filament 12, which ensures its retention by butting against the surface of the central recess 6, around the internal outlet of the passageway 8, as shown in FIG. 3.

Upon passing through this radial passageway 8, the two parts 12a and 12b resulting from the folding of the filament 12 are juxtaposed and fill the cross section of the passageway 8, as shown in FIG. 4. Advantageously, the filament 12 has an approximately square cross section, the side of which corresponds to the height of the cross section of the radial passageway 8, and therefore to half the length of this cross section. More particularly, by using a cutting line filament 12 of square cross section with concave curvilinear sides, the formation of the lateral swelling 13 ensuring retention of this filament 12 is favored.

In an alternative embodiment, as shown in FIG. 5, each cutting line filament 12 may also have a circular cross section, the diameter of which corresponds to the height of the cross section of the radial passageway 8, and therefore to half the length of the cross section of this passageway 8.

Each cutting line filament 12 is folded through 180° in the middle of its length, so as to form two cutting portions 12a and 12b of the same length, which are free and extend parallel to each other, in the same plane perpendicular to the central axis 2 of the cutting head 1. Such a doubling of the filaments 12 ensures particularly silent operation of the cutting head 1, while improving the cutting power.

During operation, one or other of the rounded surfaces 9 and 10 (depending on the direction of rotation of the head 1) serves as a bearing surface for the corresponding filament 12, at the point where it leaves the head 1, thereby preventing the phenomenon of "eyelet breakage".

It would not be outside the scope of the invention, as defined in the appended claims:

to modify the number of radial passageways made in the cutting head or to modify other shape details of this head;

to produce the head from any material, and as one or more pieces;

to modify the number of cutting line filaments fastened to the head;

to use cutting line filaments of any cross section and of any material allowing them to be folded with the formation of a swelling;

to produce or use the cutting head with line portions grouped in pairs, of the same length, which are free and parallel to each other, so as to reduce the operating noise, whatever the means of retention of these line portions on the head.

What is claimed is:

1. A rotary cutting assembly for brush cutters or edge trimmers, comprising:

a head;

a filament having a first filament portion and a second filament portion, said filament retained on said head;

said second filament portion having approximately a same length as said first filament portion;

said first and second filament portions extending freely outwardly from a fastening region of said head; and wherein, in said fastening region, said first and second filament portions extend in close vicinity of each other and are substantially parallel to each other.

2. The assembly of claim 1, wherein said head having a periphery and a central recess, said head including at least one radial passageway disposed between said periphery and said central recess, said radial passageway having a radial cross-section that is twice a filament cross-section; and wherein said filament has a first end that passes through said radial passageway a first time, said filament is folded forming a folded section, said first end passes through said radial passageway a second time, said folded section is disposed at said central recess, said folded section having a lateral swelling.

3. The assembly of claims 2, wherein said radial passageway includes a rounded surface at said periphery.

4. The assembly of claims 3, wherein said rounded surface includes two rounded surfaces arranged symmetrically so that said radial passageway has a flared shape at said periphery.

5. The rotary cutting assembly of claim 1, wherein said first and second filament portion comprise a substantially square cross-section and the first and second filament portions are disposed side-by-side in the fastening region.

6. A rotary cutting assembly for brush cutters or edge trimmers comprising:

a head; and a first filament portion and a second filament portion, said filament portions being retained on said head;

said second filament portion having approximately the same length as said first filament portion;

said first and second filament portions extending freely outwardly from a fastening region of said head;

wherein, in said fastening region, said first and second filament portions extend in close vicinity of each other and are substantially parallel to each other.

* * * * *